US009130768B2

(12) United States Patent
Moncaster et al.

(10) Patent No.: US 9,130,768 B2
(45) Date of Patent: Sep. 8, 2015

(54) PATH CHARACTERISATION IN NETWORKS

(75) Inventors: Tobias Moncaster, Colchester (GB); Arnaud Jacquet, Ipswich (GB); Alan P Smith, Ipswich (GB); Robert J Briscoe, Woodbridge (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 486 days.

(21) Appl. No.: 13/256,773

(22) PCT Filed: Mar. 16, 2010

(86) PCT No.: PCT/GB2010/000457
§ 371 (c)(1),
(2), (4) Date: Sep. 15, 2011

(87) PCT Pub. No.: WO2010/106331
PCT Pub. Date: Sep. 23, 2010

(65) Prior Publication Data
US 2012/0008521 A1    Jan. 12, 2012

(30) Foreign Application Priority Data
Mar. 16, 2009  (EP) .................................... 09250737

(51) Int. Cl.
*H04L 12/28* (2006.01)
*H04L 12/26* (2006.01)
(Continued)

(52) U.S. Cl.
CPC .......... *H04L 12/2697* (2013.01); *H04L 41/147* (2013.01); *H04L 43/50* (2013.01);
(Continued)

(58) Field of Classification Search
CPC ....................................................... H04L 12/26
USPC .................. 370/229, 235–236, 241, 248, 252
See application file for complete search history.

(56) References Cited

U.S. PATENT DOCUMENTS

| 6,101,549 | A | 8/2000 | Baugher et al. |
| 6,748,433 | B1 * | 6/2004 | Yaakov .......................... 709/224 |

(Continued)

FOREIGN PATENT DOCUMENTS

| EP | 1601152 A1 * | 11/2005 |
| EP | 2230803 A1 * | 9/2010 |

(Continued)

OTHER PUBLICATIONS

International Search Report for PCT/GB2010/000457, mailed May 3, 2010.

(Continued)

*Primary Examiner* — Khaled Kassim
*Assistant Examiner* — Berhanu Belete
(74) *Attorney, Agent, or Firm* — Nixon & Vanderhye P.C.

(57) ABSTRACT

Methods and apparatus for providing path characterization information relating to a network characteristic such as network congestion to nodes in a data network using data units being forwarded from a source to a destination via a plurality of nodes in the network, the method comprising: receiving, at a first proxy node, data units from a source, each data unit comprising a destination indication indicative of an intended destination; identifying, in respect of an intended destination indicated, a second proxy node in the network to which data units may be forwarded before being forwarded to the intended destination; and forwarding a first and at least one subsequent data unit from the first to the second proxy node via 'one or more intermediate nodes; the method further comprising assigning conditions to path characterization metrics in respect of data units traversing a path across the network from the first to the second proxy node, the initial condition being dependent on information received by the first from the second proxy node.

19 Claims, 4 Drawing Sheets

Schematic of typical proxy network

(51) Int. Cl.
*H04L 12/24* (2006.01)
*H04L 12/801* (2013.01)
*H04L 12/825* (2013.01)
*H04L 12/835* (2013.01)

(52) U.S. Cl.
CPC ............... *H04L 47/10* (2013.01); *H04L 47/11* (2013.01); *H04L 47/12* (2013.01); *H04L 47/193* (2013.01); *H04L 47/26* (2013.01); *H04L 47/30* (2013.01); *H04L 47/35* (2013.01); *H04L 43/087* (2013.01); *H04L 43/0864* (2013.01)

(56) References Cited

U.S. PATENT DOCUMENTS

| | | | |
|---|---|---|---|
| 7,023,818 | B1 * | 4/2006 | Elliott ............................ 370/328 |
| 8,259,578 | B2 * | 9/2012 | Briscoe et al. ................ 370/235 |
| 2003/0202469 | A1 * | 10/2003 | Cain ............................ 370/230 |
| 2005/0047340 | A1 * | 3/2005 | Babiarz et al. ................ 370/231 |
| 2005/0201370 | A1 * | 9/2005 | Poyhonen et al. ............ 370/389 |
| 2005/0232227 | A1 * | 10/2005 | Jorgenson et al. ............ 370/351 |
| 2007/0195698 | A1 * | 8/2007 | Briscoe et al. ................ 370/235 |
| 2008/0013527 | A1 * | 1/2008 | Rasanen ........................ 370/352 |
| 2008/0091766 | A1 * | 4/2008 | Briscoe et al. ................ 709/202 |
| 2008/0144496 | A1 * | 6/2008 | Bachmutsky .............. 370/230.1 |
| 2008/0225715 | A1 | 9/2008 | Plamondon |
| 2009/0279433 | A1 * | 11/2009 | Briscoe et al. ................ 370/235 |
| 2010/0157889 | A1 * | 6/2010 | Aggarwal et al. ............. 370/328 |
| 2011/0032941 | A1 * | 2/2011 | Quach et al. .................. 370/392 |

FOREIGN PATENT DOCUMENTS

| | | |
|---|---|---|
| EP | 2296326 B1 * | 5/2013 |
| WO | WO 01/97446 | 12/2001 |
| WO | WO 2005/096566 | 10/2005 |
| WO | WO 2005/096567 | 10/2005 |

OTHER PUBLICATIONS

European Search Report for EP Application No. 09250737, dated Aug. 27, 2009.

Briscoe, B. et al., "Re-ECN: Adding Accountability for Causing Congestion to TCP/IP", (Mar. 3, 2009), 48 pages.

Bricsoe, B. et al, "Emulating Border Flow Policing using Re-ECN on Bulk Data", CH, No. 1, (Feb. 25, 2008), 51 pages.

Briscoe, B. et al., "Policing Congestion Response in an Internetwork using Re-feedback", SIGCOMM'05, (Aug. 22-26, 2005), pp. 277-288.

Briscoe, B. et al, "Re-ECN: Adding Accountability for Causing Congestion to TCP/IP", IETF Internet Draft draft-briscoe-tsvwg-re-ecn-tcp-05 , (Jan. 2008), 84 pages.

Sheng, M-J. et al., "Analysis of ECN on TCP Performance Enhancing Proxy Performance for Satellite Networks", Military Communications Conference, (Nov. 16, 2008), pp. 1-7.

Floyd, S. et al., "Random Early Detection Gateways for Congestion Avoidance", IEEE/ACM Transactions on Networking, vol. 1, No. 4, (Aug. 1993), pp. 397-413.

Meyer, M. et al., "Performance Evaluation of a TCP Proxy in WCDMA Networks", IEEE Wireless Communications, (Oct. 2003), pp. 70-79.

Ramakrishnan, K. et al., "The Addition of Explicit Congestion Notification (ECN) to IP", RFC 3168, (Sep. 2001), 59 pages.

Eardley, P., "Pre-Congestion Notification Architecture", IETF internet draft draft-ietf-pcn-architecture-02, (Nov. 2007), 42 pages.

Kent, S. et al., "Security Architecture for the Internet Protocol", RFC 4301 (Dec. 2005), 101 pages.

Chinese Office Action issued in Chinese Patent Application No. 201080012325.1 dated Sep. 1, 2014 (w/ translation).

* cited by examiner

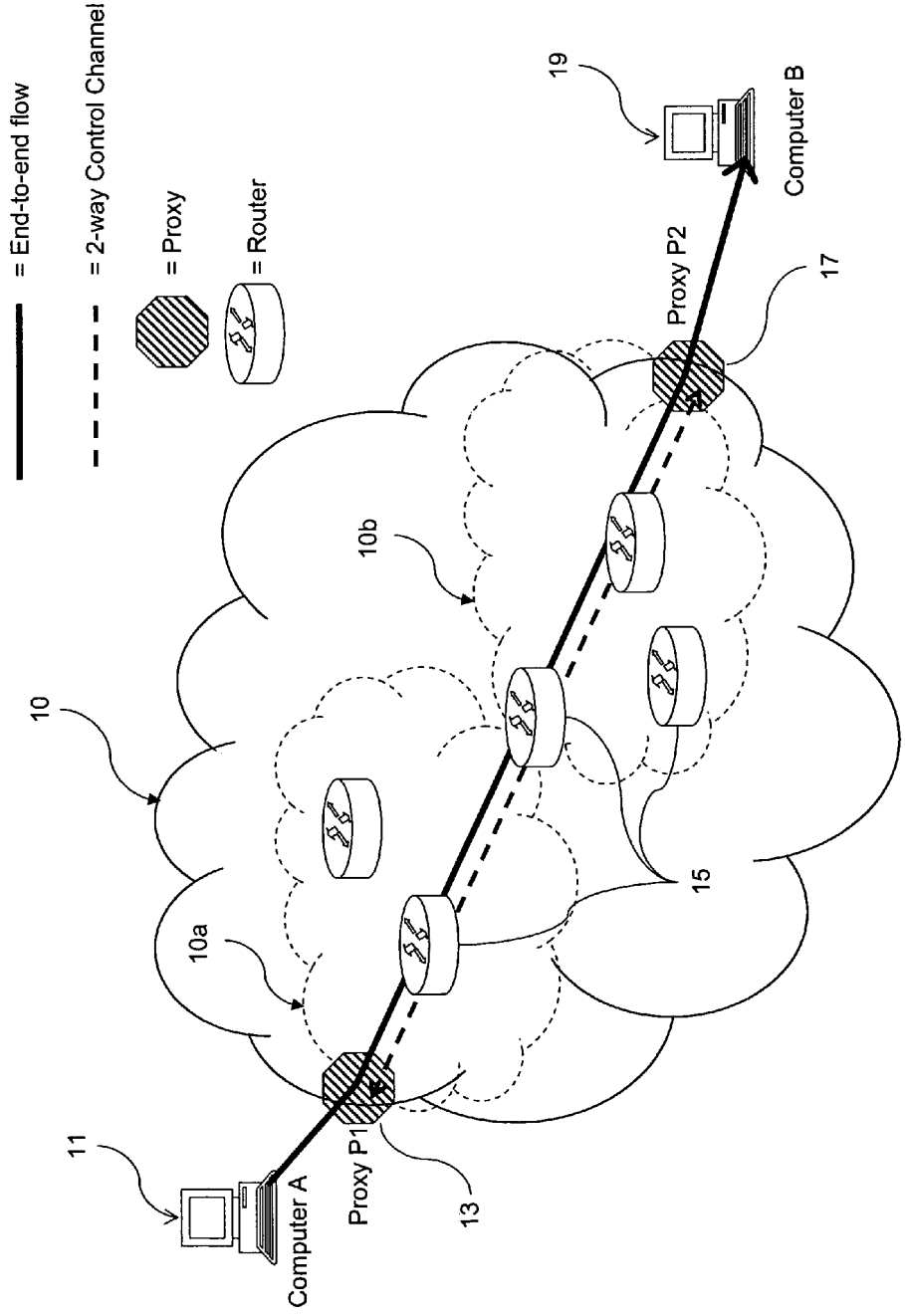
Figure 1 - Schematic of typical proxy network

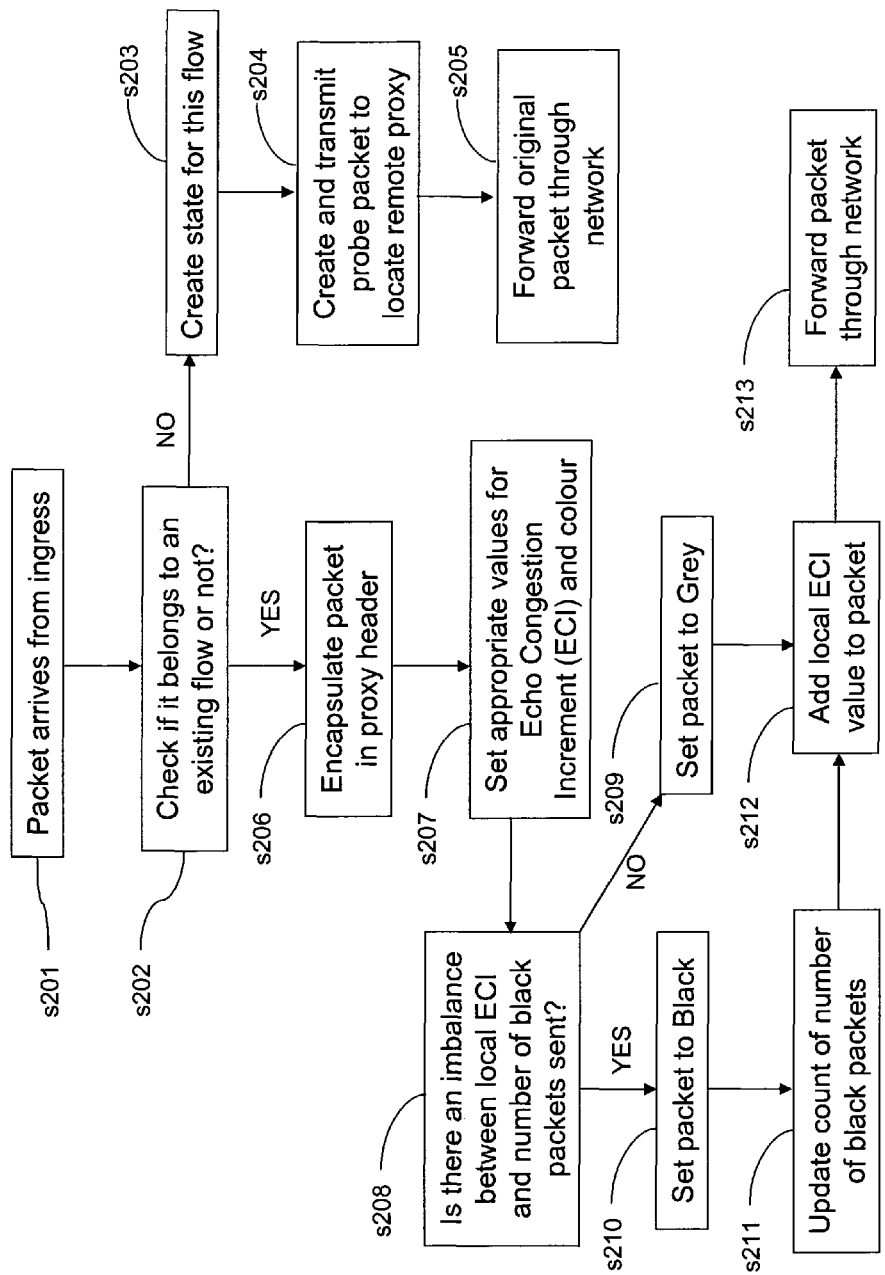
Figure 2 - Behaviour of sender proxy when dealing with new packet

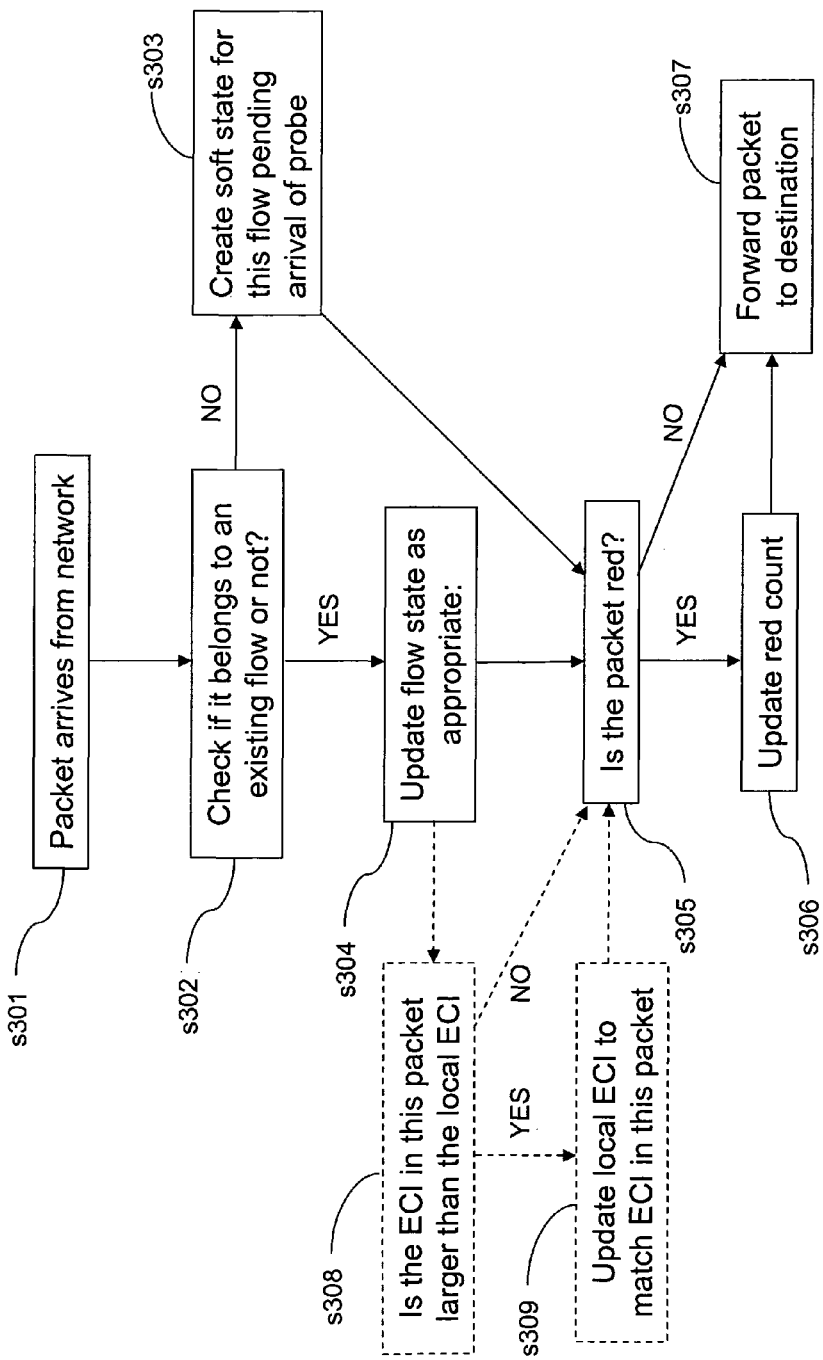
Figure 3 - Behaviour of egress proxy on arrival of new packet from network

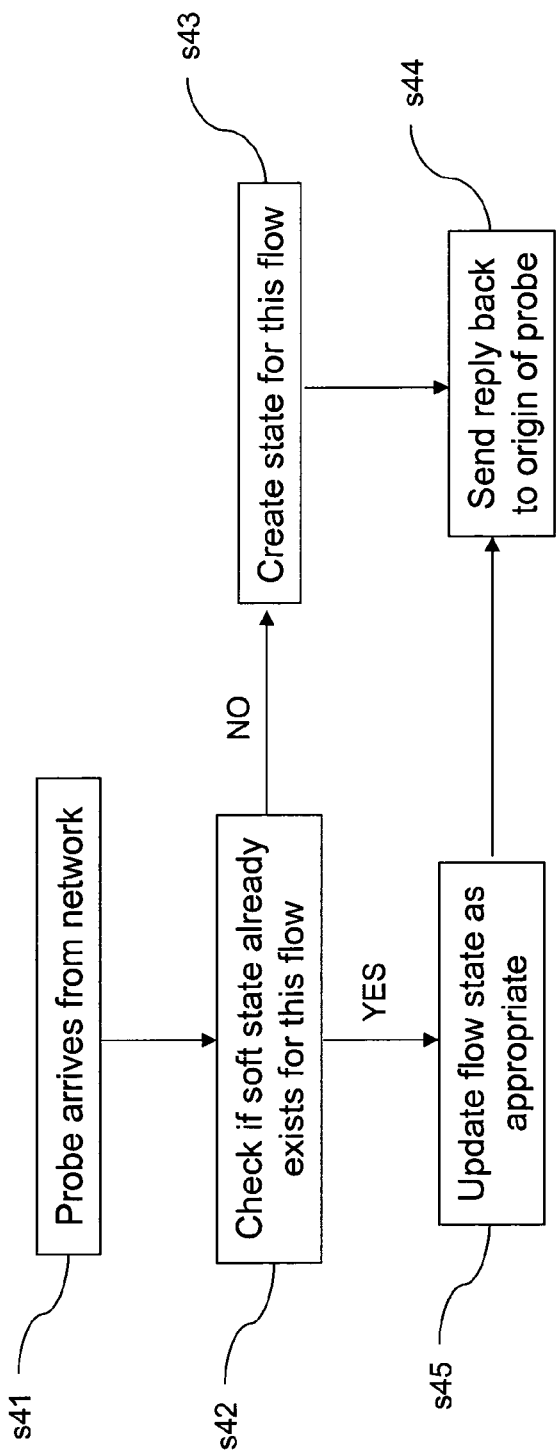
Figure 4 - Handling of probe packet at receiver proxy

PATH CHARACTERISATION IN NETWORKS

This application is the U.S. national phase of International Application No. PCT/GB2010/000457 filed 16 Mar. 2010, which designated the U.S. and claims priority to EP Application No. 09250737.5 filed 16 Mar. 2009, the entire contents of each of which are hereby incorporated by reference.

TECHNICAL FIELD

The present invention relates to path characterisation in networks. More specifically, aspects of the present invention relate to methods and apparatus for providing path characterisation information relating to network characteristics such as congestion to nodes in a data network using data units being forwarded from a source to a destination via nodes in the network . . . .

BACKGROUND TO THE INVENTION AND PRIOR ART

We start by presenting some basic concepts to facilitate the understanding of the mechanisms that are presented further on.

Packets

Data networks usually split the data they carry into small units known as packets. Each packet carries a number of headers that are defined by various communication protocols. The great majority of packets carried by commercial networks nowadays are so-called TCP-IP packets. TCP is the Transmission Control Protocol. This makes sure the data arrives reliably (in the correct order and without errors) and is sent to the correct application on the receiver. IP is the Internet Protocol. This ensures the packets are correctly transmitted from the source to the destination. In theory IP is a connectionless protocol—that means each data packet could take a different route to reach the destination. In practice the routing mechanisms on the Internet mean that this seldom happens (unless there is some form of equipment failure).

re-Feedback

One of the functions of the IP header is to carry path information from the sender to the receiver. This path information allows downstream nodes (nodes nearer the receiver) to know the upstream state of the path. Sometimes mechanisms exist to allow the receiver to feedback this information to the sender. The re-Feedback proposal (discussed in the article referred to below as [Briscoe05c]) provides a mechanism whereby the path information that a receiver feeds back to the source can be re-inserted into the forward data path, thus allowing nodes along the path to see the downstream information as well as the upstream information. However it requires one or both end-hosts to actively participate in providing extra signalling in order to achieve this.

[Briscoe05c]: B Briscoe, A Jacquet, C Di Cairano-Gilfedder, A Salvatori, A Soppera & M Koyabe: *"Policing Congestion Response in an Internetwork using Re-feedback"*, In *Proc ACM SIGCOMM'05, Computer Communications Review* 35(4) (September 2005).

International patent applications WO 2005/096566 and WO 2005/096567 relate to data networks, and to nodes making up parts of data networks, arranged to derive information relating to the characterisation of paths taken by data travelling between nodes in the networks according to the re-Feedback proposal.

Distributed Bandwidth Sharing and Congestion

Data traversing the Internet follows a path between a series of routers, controlled by various routing protocols. Each router seeks to move the packet closer to its final destination. If too much traffic traverses the same router in the network, the router can become congested and packets start to experience excessive delays whilst using that network path. If sources persist in sending traffic through that router it could become seriously overloaded (congested) and even drop traffic (when its buffers overflow). If sources still persist in sending traffic around this bottleneck it could force more routers to become congested, and if the phenomenon keeps spreading, that can lead to a congestion collapse for the whole Internet—which occurred regularly in the mid-eighties.

The solution to that problem has been to ensure that sources take responsibility for the rate at which they send data over the Internet by implementing congestion control mechanisms. Sources monitor path characterisation metrics to detect when the path their data is following is getting congested, in which case they react by reducing their throughput—while they may slowly increase it when there is no sign of the path getting congested. The typical path characterisation metrics that sources monitor are the average roundtrip time (RTT) for the data path, the variance of the roundtrip time (jitter) and the level of congestion on the path. The congestion is one of the parameters controlling the rate adaptation of a source sending data over a congested path.

The congestion level can be signalled either implicitly (through congested routers dropping packets when their buffers overflow or to protect themselves) or explicitly (through mechanisms such as explicit congestion notification—see next subsection). Currently the most common option is implicit signalling. Historically, routers would drop packets when they got completely saturated (which happens when a traffic burst cannot be accommodated in the buffer of the router)—this policy is called Droptail. Random Early Detection (RED) [RED] is an improvement where routers monitor the average queue length in their buffer and when the average queue is higher than a given threshold, the router starts to drop packets with a probability which increases with the excess length of the queue over the threshold. It is widely used in today's internet because it allows sources to react more promptly to incipient congestion. Sources using TCP are able to detect losses, because a packet loss causes a gap in the sequence; whenever a TCP source detects a loss, it is meant to halve its data transmission rate, which alleviates the congestion on the router at the bottleneck.

[RED]: S Floyd & V Jacobson: *"Random Early Detection Gateways for Congestion Avoidance"*, *IEEE/ACM Transactions on Networking*, Vol 1-4 (397-413) August 1993.

Explicit Congestion Notification

Explicit Congestion Notification (ECN) [ECN] further improves on RED by using a two-bit ECN field in the IP header to signal congestion. It runs the same algorithm as RED, but instead of dropping a packet, it sets its ECN field to the Congestion Experienced (CE) codepoint. The ECN standard requires the sender to echo any congestion mark signalled in the data; for instance, a TCP receiver sets the Echo Congestion Experienced (ECE) flag in the TCP header, which the TCP source interprets as if the packet has been dropped for the purpose of its rate control. In turn the source then reacts to the congestion by halving its transmission rate and notifies the receiver of this using the Congestion Window Reduced codepoint.

[ECN]: K Ramakrishnan, S Floyd & D Black: *"The Addition of Explicit Congestion Notification (ECN) to IP"*, RFC 3168, September 2001.

The four values of the two-bit ECN field in the IP header are:
- Non ECT, which signifies that the packet belongs to a flow that doesn't support ECN.
- ECT(0) and ECT(1), which signify that the packet belongs to a flow that supports ECN but that upstream routers haven't had to mark the packet.
- Congestion Experienced (CE) which signals that a packet has experienced incipient congestion.

It will be understood that allowing a sender to initially assign either of two different codepoints (i.e. "ECT(0)" and "ECT(1)") to a packet enables the sender to detect if network elements are fraudulently erasing CE codepoints. If a packet which has experienced congestion and therefore has been marked with a "CE" codepoint subsequently has that CE codepoint removed in an attempt to hide the indication that the packet has experienced congestion, this will be detectable by the sender unless the CE codepoint has been changed back to the correct one of the two possible initial codepoints.

Re-ECN

Re-ECN (see [Briscoe08] and [Briscoe09]) is an example of a system that utilises re-feedback to provide upstream and downstream congestion information throughout the network. It is similar to ECN but uses an extra bit in the packet header. This bit enables a number of new codepoints to be used. A simple way to understand the protocol is to think of each packet as having a different colour flag (codepoint). At the start of a flow, a green flag (FNE or feedback not established) is used to indicate that you don't have existing knowledge of the path. Green flags are also used when the sender is unsure about the current state of the path. By default packets are marked with grey flags. If they encounter congestion during their progress through the network they are marked with a red flag. The destination will send back a count of the number of red flags it has seen. For every red flag it is informed of, the sender should send a packet with a black flag (re-echo). These black flags cannot be modified once they are set by the sender. At any intermediate node the upstream congestion is given by the number of red flags seen and the downstream is given by the difference between the number of red and number of black flags.

[Briscoe08]: B Briscoe, A Jacquet, T Moncaster & A Smith: "*Re-ECN: Adding Accountability for Causing Congestion to TCP/IP*", IETF Internet Draft draft-briscoe-tsvwg-re-ecn-tcp-05, January 2008.

[Briscoe09]: B Briscoe et al: "*Re-ECN: Adding Accountability for Causing Congestion to TCP/IP*", IETF Internet Draft draft-briscoe-tsvwg-re-ecn-tcp-07, March 2009.

It should be noted that while these two documents mention the use of proxies, they fail to indicate how such use could be implemented in an actual system for providing information relating to congestion or any other network characteristics to nodes in a network.

Pre-Congestion Notification

Pre-Congestion Notification (PCN) [PCN] is a mechanism for protecting the quality of service of certain flows within a given region of the network. Flows are only admitted to the network if they won't cause too much congestion. In order to work out if a flow can be admitted, the incipient congestion inside the network is monitored for each path through the network. This allows the ingress node to predict whether there is likely to be congestion for any given flow asking for admission.

[PCN]: P Eardley (editor): "*Pre-Congestion Notification Architecture*", IETF internet draft draft-ietf-pcn-architecture-02, November 2007.

IP Tunnels

In the context of a data network, tunnelling consists of encapsulating one protocol inside another protocol, and aims to improve the network service, for instance in terms of connectivity (it allows data to get across a network it couldn't get across otherwise), of security (the data is encrypted so it cannot be used if it is intercepted), etc. . . .

A special case of tunnelling is IP-in-IP tunnels where the original header is retained intact and simply encapsulated in another standard IP header at the entrance of the tunnel. The outer IP header source and destination addresses identify the "endpoints" of the tunnel while the inner header preserves the original source and destination addresses for the packet. As the packet traverses the tunnel, the outer header may be modified as the header of any other packet on the same path. When the packet reaches the other end of the tunnel, decapsulation occurs: the outer header is stripped off, the original header fields are updated if necessary, and the packet is forwarded to its original destination.

Other Known Techniques

Proxies are widely used at the application layer for such applications as HTTP, where they can reduce the load on servers and networks by serving popular files themselves. Other popular uses of proxies are to circumvent security controls, for instance to access websites that have been blocked by the user's Internet Service Provider (ISP) or to anonymise the user's network usage.

U.S. Pat. No. 6,101,549 relates to the use of a proxy for a given destination when establishing path reservations in the absence of precise details of the destination, introducing the idea of using proxy headers in order to re-direct data from its original destination to a proxy. This is discussed in relation to the sending of RSVP (resource reservation protocol) messages in order to facilitate the reservation of a path.

Another established use of TCP proxies is in high delay-bandwidth wireless networks such as those operating over satellite. These are designed to improve the performance and reliability of TCP which may be particularly poor when Round-Trip Time (RTT) delays are excessive [Meyer].

[Meyer]: M Meyer, J Sachs & M Holzke: "*Performance Evaluation of a TCP Proxy in WCDMA Networks*", IEEE Wireless Communications Vol 10 Issue 5, October 2003.

OTHER PRIOR ART REFERENCES

S Kent & K Seo: "Security Architecture for the Internet Protocol", RFC 4301 (December 2005) describes an updated version of the "Security Architecture for IP", for providing security services for traffic at the IP layer. In particular, it specifies the base architecture for IPsec-compliant systems, IPsec ("Internet Protocol Security") being a protocol suite for securing IP communications by authenticating and encrypting each IP packet of a data stream.

A document by B Briscoe entitled: "Emulating Border Flow Policing using Re-ECN on Bulk Data", IETF internet draft draft-briscoe-re-pcn-border-cheat-01 (February 2008) relates to the problem of scaling per flow admission control to the Internet, and discusses how an approach combining DiffServ and PCN to provide a service slightly better than IntServ controlled load can scale to networks of any size, but only if domains trust each other to comply with admission control and rate policing. This document relates to solving this trust problem without losing scalability, and describes bulk border policing that provides a sufficient emulation of per-flow policing with the help of re-ECN, and explains how sanctions can be applied against cheating networks with only passive bulk measurements being made at borders. It should be noted that while this document mentions the use of proxies, it fails to indicate how such use could be implemented in an actual system for providing information relating to a network characteristic to nodes in a data network US patent application US 2008/225715 ("Plamondon") relates to dynamic control of bandwidth of connections. A proxy for one or more connections may allocate, distribute or generate indications of network congestion via one or more connections in order to induce senders of the connections to reduce their rates of transmission. The proxy may do this in such a way as to provide quality of service to one or more connections, or to ensure that a number of connections transmit within an accepted bandwidth limit.

A paper by Ming-Jye Sheng et al entitled "Analysis of ECN on TCP Performance Enhancing Proxy performance for satellite networks" (IEEE, MILCOM 2008, November 2008) relates to proxying for TCP over satellite connections, and suggests using proxies to split a TCP connection into two or more parts in order to improve performance.

International patent application WO 01/97446 relates to the enhancement of ECN for wireless and/or mobile network applications to avoid network congestion in a TCP/IP packet-switched network.

SUMMARY OF THE INVENTION

According to a first aspect of the present invention, there is provided a method of providing path characterisation information relating to a network characteristic to nodes in a data network using data units being forwarded from a source to a destination via a plurality of nodes in said network, the method comprising steps of:
receiving, at a first proxy node in said network, data units from a source, each data unit comprising a destination indication indicative of an intended destination for said data unit;
identifying, in respect of an intended destination indicated in relation to a plurality of data units received at said first proxy node, a second proxy node in said network to which data units may be forwarded before being forwarded on to said intended destination; and
forwarding a first and at least one subsequent data unit having destination indication indicative of said intended destination from said first proxy node to said second proxy node via one or more intermediate nodes in said network;
said method further comprising:
assigning an initial condition to a path characterisation metric in respect of each of a plurality of data units intended to be forwarded from said first proxy node to said second proxy node, the initial condition being dependent on information received from the second proxy node;
updating the condition of the path characterisation metric in respect of data units being forwarded from said first proxy node to said second proxy node in dependence on current measures of said network characteristic at said one or more intermediate nodes as said data units traverse a path across said network from said first proxy node to said second proxy node;
monitoring a final condition of the path characterisation metric in respect of data units forwarded from said first proxy node and received by said second proxy node; and
providing information from said second proxy node to said first proxy node whereby to enable an initial condition to be assigned to the path characterisation metric in respect of a subsequent data unit whereby to decrease a discrepancy between a first measure of said network characteristic indicated by data units having an initial condition of a first type assigned thereto during a predetermined period and a second measure of said network characteristic indicated by data units having a final condition of a second type during a predetermined period.

According to a second aspect of the present invention, there is provided an apparatus for providing path characterisation information relating to a network characteristic to nodes in a data network using data units being forwarded from a source to a destination via a plurality of nodes in said network, the apparatus comprising:
a first proxy node operable to receive data units from a source, each data unit comprising a destination indication indicative of an intended destination for said data unit; to identify, in respect of an intended destination indicated in relation to a plurality of data units received at said first proxy node, a second proxy node in said network to which data units may be forwarded before being forwarded on to said intended destination; and to forward a first and at least one subsequent data unit having destination indication indicative of said intended destination from said first proxy node to said second proxy node via one or more intermediate nodes in said network, said one or more intermediate nodes being operable to update the condition of a path characterisation metric in respect of data units being forwarded from said first proxy node to said second proxy node in dependence on current measures of said network characteristic at said one or more intermediate nodes as said data units traverse a path across said network from said first proxy node to said second proxy node; and
a second proxy node operable to receive said first and said at least one subsequent data unit forwarded from said first proxy node;
wherein said first proxy node is further operable to assign an initial condition to said path characterisation metric in respect of each of a plurality of data units intended to be forwarded from said first proxy node to said second proxy node, the initial condition being dependent on information received from the second proxy node;
and wherein said second proxy node is further operable to monitor a final condition of the path characterisation metric in respect of data units forwarded from said first proxy node and received by said second proxy node; and to provide information to said first proxy node whereby to enable an initial condition to be assigned to the path characterisation metric in respect of a subsequent data unit whereby to decrease a discrepancy between a first measure of said network characteristic indicated by data units having an initial condition of a first type assigned thereto during a predetermined period and a second measure of said network characteristic indicated by data units having a final condition of a second type during a predetermined period.

Preferred embodiments of the present invention are related to the re-feedback proposal discussed above, but where re-feedback currently relies on end-hosts utilising existing signalling channels to provide the necessary feedback and feed forward loops, embodiments of the present invention allow the re-feedback functionality is brought inside the edges of a suitably-capable network by using proxies. The proxies may set up an independent control channel between themselves to do the required signalling to enable re-feedback. Methods for doing this may involve a combination of tunnelling the data using re-ECN enabled outer headers and using separate control packets where insufficient data is being sent to ensure reliable feedback.

The mechanism may involve or closely resemble the creation of a tunnel between the two proxies to enable the monitoring of the congestion information, tunnelling being used to facilitate embodiments of the invention. Simple tunnelling is itself not enough to provide the re-feedback functionality, as the mechanisms for path characterisation feedback are missing. By combining appropriate path characterisation feedback with a tunnel that is used for carrying control and feedback information, embodiments of the invention allow such feedback to be provided even in the absence of any higher-layer protocol mechanism.

According to preferred embodiments of either aspect, the first measure of said network characteristic may be indicated by the number of data units having an initial condition of said first type assigned thereto during said predetermined period, the second measure of said network characteristic being indicated by the number data units having a final condition of said second type during said predetermined period. Such embodiments may be particularly applicable in relation to networks in which the condition of the path characterisation metric carried by an individual data unit may be in one of only two (or a small number of) different states and therefore indicate one of only two (or a small number of) different states of the network characteristic in question. Where the network characteristic is congestion, for example, each individual data unit may carry a path characterisation metric the condition of which may simply indicate either that congestion has been experienced by that data unit or that congestion has not been experienced by that data unit—monitoring of a plurality of data units may however provide a current measure of the level of congestion on the path.

Alternatively, the first measure of said network characteristic may be indicated by information carried by an individual data unit having an initial condition of said first type assigned thereto during said predetermined period, the second measure of said network characteristic being indicated by information carried by an individual data unit having a final condition of said second type during said predetermined period. Such embodiments may be particularly applicable in relation to networks in which the condition of the path characterisation metric carried by an individual data unit may be in any of a large number of different states, or may be continuously variable, and therefore be able to indicate any of a large number of different states of the network characteristic in question.

According to preferred embodiments, the network characteristic in relation to which path characterisation information is provided may be network congestion. In such embodiments, the first measure of said network characteristic may relate to a measure of the total amount of downstream congestion currently expected on a path across said network from said first proxy node to said second proxy node, and the second measure of said network characteristic may relate to a measure of the amount of congestion that has been experienced by data units on a path across said network from said first proxy node to said second proxy node.

Embodiments where the network characteristic in relation to which path characterisation information is provided is congestion are particularly applicable where the first and second proxy nodes and any nodes on the path therebetween are capable of assigning, updating or monitoring a condition of a codepoint in a field carrying congestion information, such as an ECN field, for example. In particular, such embodiments are applicable where intermediate nodes operate according to a standard such as ECN, whereby data units in respect of which a condition of a first type ("congestion experienced" in the case of ECN) has been assigned remain having said condition assigned in respect thereof.

According to other embodiments, the network characteristic in relation to which path characterisation information is provided may be a characteristic other than network congestion, such as delay, congestion of battery-limited resources, or congestion of state-limited resources, for example.

Controlling a network with shared resources of different nature may require the communication of different types of path metrics to ensure end-systems take account of all those factors in making control decisions. For instance, some resources may have limited battery power (for instance if one of the nodes on the path is a wireless node not connected to the mains) or limited state available (for instance if one node operates Network Address Translation (NAT) for many simultaneous connections). Each of these metrics may require a different metric being communicated in data packets, which would require using extra fields or codepoints in packet headers.

BRIEF DESCRIPTION OF THE DRAWINGS

Preferred embodiments of the present invention will now be described with reference to the appended drawings, in which:

FIG. 1 shows a simple network scenario with two computers each connected to a proxy, the traffic between them all flowing in the same direction, and a feedback loop set up between the proxies to provide information to enable re-feedback;

FIG. 2 is a flow chart showing the behaviour of a sender proxy at a network ingress when dealing with the arrival of a new packet;

FIG. 3 is a flow chart showing the behaviour of a receiver proxy at a network egress when dealing with the arrival of a packet that has traversed the network from the sender proxy; and FIG. 4 shows how a probe packet is handled by the receiver proxy.

DESCRIPTION OF PREFERRED EMBODIMENTS OF THE INVENTION

Preferred embodiments provide a mechanism whereby proxies within a network are able to provide the necessary feedback signalling to allow re-feedback to be used without being explicitly supported by the end hosts. This enables an operator or group of operators to deploy re-feedback signalling without end-system support, or on behalf of senders and/or receivers that do not have the appropriate capability required for re-feedback signalling. A key thing to note is that preferred embodiments operate solely at the network layer. That is to say a proxy may treat all IP packets from a given source to a given destination as a single flow, regardless of what any higher-layer protocol might be doing. This is important as it enables this mechanism to work for all transport protocols, not just for TCP (as is the case in end-to-end re-ECN).

For simplicity the sender and receiver proxy are assumed to be separate devices though clearly they will often be integrated into a single machine.

With reference to FIG. 1, we start by imagining a simple network consisting of two computers, "Computer A" 11 and "Computer B" 19, connected across a network 10 with several intermediate routers 15. There may be a plurality of interconnected networks 10a, 10b, etc. (shown using dashed lines) between Computers A and B, possibly of different types or operated by different entities, rather than a single, homogenous, uniformly-controlled network, but for the purposes of this description, it will be treated as being a single network.

Computer A is connected to the network 10 through "Proxy P1" 13 and Computer B is connected through "Proxy P2" 17. To simplify the description, the following explanation relates to a situation where Computer A is simply acting as a sender of data while Computer B is simply acting as a receiver of data. It will be understood that both computers may in fact be performing both the sending and the receiving functions.

The steps involved in providing path characterisation in respect of the specific case of an ECN-capable network will now be described with reference to FIGS. 2, 3 and 4. For simplicity, the condition of the packets will be described in terms of the "re-ECN" model discussed earlier, in which they are said to be marked as "grey" (by default at Proxy P1), "green" (for feedback not established), "red" (at any node between Proxy P1 and Proxy P2 at which they encounter congestion during their progress through the network), or "black" (to re-echo feedback received by Proxy P1 from Proxy P2 indicating that a "red" packet has been received by Proxy P2. It will be understood that these colours are used to represent codepoints in relation to the information that may be carried in the ECN field of the IP header of packets, for example.

We start by assuming no communication has been happening between Computers A and B. Computer A then sends a packet destined for Computer B. With reference to FIG. 2, Proxy P1 intercepts this packet (step s201) and checks to see if there is any state for this flow (step s202). Not finding any state it forwards the packet (step s205) and creates some soft state for this flow (step s203). At the same time it creates a probe packet bound for the same address (step s204). This probe packet carries information about the new flow for Proxy P2. This would generally include a verification code (or hash) and the address of Proxy P1 as the origin. The probe packet will be marked with a green flag in an analogous fashion to the FNE packets in re-ECN. With reference to FIG. 4, which illustrates the handling of a probe packet at Proxy P2, Proxy P2 intercepts this probe packet (step s41) and checks if soft state already exists for this flow (step s42). If not, it creates its own state for this flow (step s43). It then sends a response back to Proxy P1 (step s44) indicating its own address and including the verification code. Any subsequent traffic between Computers A and B may now belong to this flow, thus for further packets of the same flow, rather than repeating step s43, Proxy P2 updates the flow state as appropriate at step s45 before sending any appropriate reply back to Proxy P1.

In respect of subsequent packets in the same flow, Proxy P1 (for the sender) now has a simple task. With reference again to FIG. 2, any subsequent packet that arrives from A bound for B is encapsulated into a new IP header (step s206). This header is re-ECN enabled and will carry either a grey flag if there is no congestion to re-echo or a black flag if there is outstanding congestion to re-echo (steps s207-s212). The destination address is the address of P2 and the verification code will either be hashed into the IP header or included as an IP option. The colour of the flag is determined in dependence on the currently determined value of the Echo Congestion Increment (ECI), set (at step s 207) in dependence on feedback received from Proxy P2 (as explained later). Proxy P1 compares the local ECI with the number of black-flagged packets it has sent (s208), effectively comparing values over a recent period, since a previous re-set operation, or during the lifetime of the flow, for example, and marks packets in the following manner.

If there is no imbalance between the local ECI and the number of black packets previously sent, the next packet is assigned a grey flag (s209).

If there is an imbalance between the local ECI and the number of black packets previously sent, the next packet is assigned a black flag (s210), and the overall count of the number of packets assigned black flags is updated (step s211).

The assigning of a grey or black flag to a packet essentially indicates whether or not Proxy P1 has received incremental information from Proxy P2 indicating that a previous indication of the expected level of downstream congestion on the path from Proxy P1 to Proxy P2 was an under-estimate of the actual amount of congestion experienced by previous packets that have completed the journey from Proxy P1 to Proxy P2. (The manner in which this is determined by Proxy P2 will be explained later with reference to FIG. 3).

The local ECI is then added to the packet (step s212) which is then forwarded through the network towards Proxy P2 (step s213).

With reference to FIG. 3, Proxy P2 (the receiver) receives packets being forwarded from Computer A towards Computer B (step s301). These it decapsulates and forwards to Computer B having checked they are genuinely part of this flow (step s302). If they are not part of an existing flow, Proxy P2 may create soft state for this, treating it as a new flow, pending the arrival of a probe packet relating thereto (step s303). If they are part of an existing flow, the flow state is updated as appropriate (step s304). In either of these cases, Proxy P2 inspects the packets (step s305). If a packet is found to be marked with a red flag (indicating "congestion experienced") it will increment its local congestion count (step s306). This will be forwarded to the local sender proxy to be returned to Proxy P1 so that Proxy P1 may determine whether it needs to mark any subsequent packets with black flags, and if so, how many, as explained earlier with reference to steps s207 to s212 of FIG. 2.

The packet may then be forwarded to its eventual destination (step s307).

If the flow of data is entirely (or predominantly) one way then the proxy at the down-stream end of the connection may need to send periodic update information back to other proxy to inform it of the current congestion state for the link (the number of red flags it has seen). These may be IP packets with no data but using an IP option to carry the updated count of congestion marks.

While the above explanation relates to the situation where Computer A is simply acting as a sender of data while Computer B is simply acting as a receiver of data, both computers may in fact be performing both the sending and the receiving functions, in which case each of Proxies P1 and P2 may be receiving feedback from the other enabling each to perform the functions of both. In this case (i.e. where there is a two-way communication happening, and where there is re-ECN or other feedback running in both directions), Proxy P2 may also perform steps such as those indicated by steps s308 and s309, proceeding along the dotted arrows from step s304 to step s305 rather than the solid line linking these steps directly.

If there has been no recent traffic between computers A and B then any flow state may become stale and may have to be discarded. In this instance it may be necessary to re-start the connection in the same manner as for a new connection.

The mechanism can be easily adapted for use where there is a proxy at one end and a re-feedback capable host at the other end. In such a situation it may be necessary to change the mechanism for authenticating the flow.

Embodiments Using Single-Bit or Multi-Bit Congestion Indications

The principal embodiment described above has been described in the context of an ECN-capable network, in which packets can be marked in such a way as to provide an indication—to whichever node they have presently reached—whether or not they have experienced congestion on the path from upstream of that node. As explained above in the section on "re-ECN", using feedback of appropriate information as provided from a node at the end of a path (or section thereof) to the start of that path (or section thereof) allows for packets to provide not only upstream congestion information but also accurate, up-to-date predictions of downstream congestion to nodes at any point on the path (or section thereof) throughout the network, by virtue of the fact that such predictions may be obtained at any node by a node subtracting the amount of actual upstream congestion from an accurate, up-to-date measure of end-to-end congestion on the path. Both of these measures may be carried to any node on the path by the packets of a flow on that path.

Simply indicating whether or not a packet has experienced congestion can be achieved with a single-bit binary field (e.g. "0" for "no congestion experienced so far"; "1" for "some congestion already experienced"). ECN uses an extra bit, but as explained earlier, this is partly in order to provide enough different codepoints to allow for mechanisms allowing senders to verify that network elements are not erasing "Congestion Experienced" codepoints—the information carried by a single packet generally indicates simply whether an individual packet has experienced "some congestion already" or "no congestion so far" without any indication of a measure of "how much" congestion that packet may have experienced. Even with re-ECN, the individual information carried by an individual packet generally relates to whether that packet has experienced "some congestion" or "no congestion". For a measure of the level of congestion on a path, the information must therefore generally be encoded using more than one packet. For instance, for a path currently suffering 3% congestion, for a sequence of 100 packets sent, Proxy P1 would send 3 packets with "BLACK" flags, and if the path remains at 3% congestion, Proxy P2 would receive 3 "BLACK" packets and 3 "RED" packets.

Alternative embodiments may however use a multi-bit signal in order to allow an individual packet to carry a measure of the level of congestion on a path. For the situation above, with a path currently suffering 3% congestion, if using a multi-bit signal, Proxy P1 may be able to send each individual packet with a first multi-bit congestion field set to indicate "expected congestion" of 3%, and if the path remains at 3% congestion, Proxy P2 will receive those packets each having a second multi-bit congestion field set to indicate "experienced congestion" set to 3%.

What is claimed is:

1. A method of providing path characterisation information relating to a network characteristic to nodes in a data network using data units being forwarded from a source to a destination via a plurality of nodes in said network, the method comprising steps of:
   receiving, at a first proxy node in said network, data units from a source, each data unit comprising a destination indication indicative of an intended destination for said data unit;
   identifying and selecting, in respect of an intended destination indicated in relation to a plurality of data units received at said first proxy node, a second proxy node in said network to which data units may be forwarded before being forwarded on to said intended destination; and
   forwarding a first and at least one subsequent data unit having destination indication indicative of said intended destination from said first proxy node to said selected second proxy node via one or more intermediate nodes in said network; said method further comprising:
   assigning an initial condition to a path characterisation metric in respect of each of a plurality of data units intended to be forwarded from said first proxy node to said selected second proxy node, the initial condition being dependent on information received from the selected second proxy node;
   updating the condition of the path characterisation metric in respect of data units being forwarded from said first proxy node to said selected second proxy node in dependence on current measures of said network characteristic at said one or more intermediate nodes as said data units traverse a path across said network from said first proxy node to said selected second proxy node;
   monitoring a final condition of the path characterisation metric in respect of data units forwarded from said first proxy node and received by said selected second proxy node; and
   providing information from said selected second proxy node to said first proxy node by routing said information from said selected second proxy node to said first proxy node via one or more intermediate nodes in said network, the provision of such information enabling an initial condition to be assigned to the path characterisation metric in respect of a subsequent data unit, whereby to decrease a discrepancy between a first measure of said network characteristic indicated by data units having an initial condition of a first type assigned thereto during a predetermined period and a second measure of said network characteristic indicated by data units having a final condition of a second type during a predetermined period.

2. A method according to claim 1 wherein the first measure of said network characteristic is indicated by the number of data units having an initial condition of said first type assigned thereto during said predetermined period, and wherein the second measure of said network characteristic is indicated by the number data units having a final condition of said second type during said predetermined period.

3. A method according to claim 1 wherein the first measure of said network characteristic is indicated by information carried by an individual data unit having an initial condition of said first type assigned thereto during said predetermined period, and wherein the second measure of said network characteristic is indicated by information carried by an individual data unit having a final condition of said second type during said predetermined period.

4. A method according to claim 1 wherein the network characteristic is congestion.

5. A method according to claim 4 wherein the first measure of said network characteristic relates to a measure of the total amount of downstream congestion currently expected on a path across said network from said first proxy node to said selected second proxy node.

6. A method according to claim 4 wherein the second measure of said network characteristic relates to a measure of the amount of congestion that has been experienced by data units on a path across said network from said first proxy node to said selected second proxy node.

7. A method according to claim 1 wherein the network characteristic is delay, congestion of battery-limited resources, or congestion of state-limited resources.

8. A method according to claim 1 wherein said first and said selected second proxy nodes and one or more nodes on the path there between are capable of assigning, updating or monitoring a condition of a codepoint in a field carrying congestion information in respect of said data units, and wherein the condition of said path characterisation metric relates to the condition of said codepoint.

9. A method according to claim 8 wherein said first and said selected second proxy nodes and one or more nodes on the path there between are capable of assigning, updating or monitoring a condition of a codepoint in an ECN field of said data units.

10. A method according to claim 1 wherein said each intermediate node operates according to a protocol whereby data units in respect of which a condition of said first type his been assigned remain having said condition assigned in respect thereof.

11. A method according to claim 1, further comprising a step of forwarding said first and said at least one subsequent data unit from said selected second proxy node to said intended destination.

12. A method according to claim 1 wherein the data network comprises a plurality of inter-connected networks.

13. A method according to claim 1 wherein said final condition of the path characterisation metric in respect of a data unit forwarded from said first proxy node to said selected second proxy node is the condition of the path characterisation metric of that data unit upon receipt of that data unit by said selected second proxy node.

14. An apparatus for providing path characterisation information relating to a network characteristic to nodes in a data network using data units being forwarded from a source to a destination via a plurality of nodes in said network, the apparatus comprising:
- a first proxy node operable to receive data units from a source, each data unit comprising a destination indication indicative of an intended destination for said data unit;
- to identify and select, in respect of an intended destination indicated in relation to a plurality of data units received at said first proxy node, a second proxy node in said network to which data units may be forwarded before being forwarded on to said intended destination; and
- to forward a first and at least one subsequent data unit having destination indication indicative of said intended destination from said first proxy node to said selected second proxy node via one or more intermediate nodes in said network, said one or more intermediate nodes being operable to update the condition of a path characterisation metric in respect of data units being forwarded from said first proxy node to said selected second proxy node in dependence on current measures of said network characteristic at said one or more intermediate nodes as said data units traverse a path across said network from said first proxy node to said selected second proxy node; and
- said second proxy node operable to receive said first and said at least one subsequent data unit forwarded from said first proxy node;
- wherein said first proxy node is further operable to assign an initial condition to said path characterisation metric in respect of each of a plurality of data units intended to be forwarded from said first proxy node to said selected second proxy node, the initial condition being dependent on information received from the selected second proxy node; and
- wherein said selected second proxy node is further operable to monitor a final condition of the path characterisation metric in respect of data units forwarded from said first proxy node and received by said selected second proxy node; and
- to provide information to said first proxy node by routing said information from said selected second proxy node to said first proxy node via one or more intermediate nodes in said network, the provision of such information enabling an initial condition to be assigned to the path characterisation metric in respect of a subsequent data unit, whereby to decrease a discrepancy between a first measure of said network characteristic indicated by data units having an initial condition of a first type assigned thereto during a predetermined period and a second measure of said network characteristic indicated by data units having a final condition of a second type during a predetermined period.

15. An apparatus according to claim 14, said selected second proxy node further being operable to forward said first and said at least one subsequent data unit to said intended destination.

16. The method according to claim 1, wherein the provision of said information from said selected second proxy node to said first proxy node comprises routing said information via said data network.

17. The method according to claim 1, where the provision of said information from said selected second proxy node to said first proxy node comprises routing said information via one or more nodes of said data network.

18. The apparatus according to claim 14, wherein said selected second proxy node is configured to provide said information from said selected second proxy node to said first proxy node by routing said information via said data network.

19. The apparatus according to claim 14, wherein said selected second proxy node is configured to provide said information from said selected second proxy node to said first proxy node by routing said information via one or more nodes of said data network.

* * * * *